Dec. 23, 1958  J. P. ZALLEA  2,865,660
INTERNALLY REINFORCED BELLOWS-TYPE EXPANSION JOINT UNIT
Filed Aug. 3, 1953  2 Sheets-Sheet 1

INVENTOR.
JAMES P. ZALLEA
BY
ATTORNEY.

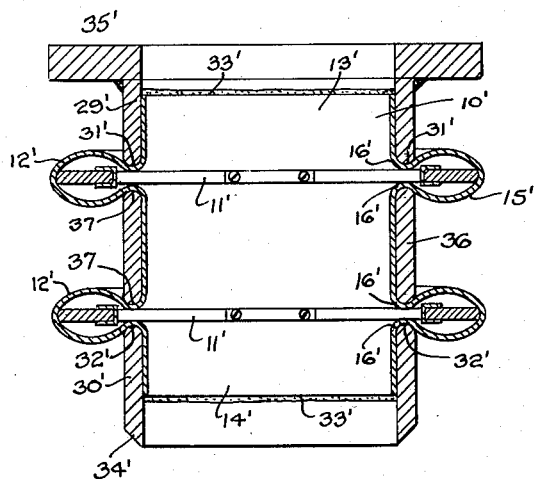

United States Patent Office 2,865,660
Patented Dec. 23, 1958

2,865,660

INTERNALLY REINFORCED BELLOWS-TYPE EXPANSION JOINT UNIT

James P. Zallea, Wilmington, Del.

Application August 3, 1953, Serial No. 371,971

4 Claims. (Cl. 285—229)

This invention relates generally to expansion joints and is more particularly concerned with expansion joints each having a bellows element provided with an annular corrugation and having means effective to control the form of the latter under operating conditions.

A principal object of the present invention is to provide an expansion joint having as a part thereof a bellows element provided with an annular corrugation and having supporting means internally of the latter for controlling the form thereof under operating conditions.

Another object of the present invention is to provide an expansion joint having as a part thereof a bellows element provided with an annular corrugation which has an ovaloid cross section the major axis of which extends normal to the axis of the expansion joint and having a ring internally of the annular corrugation for supporting the latter to prevent its assuming a circular cross section under operating conditions.

Other objects and advantages of the present invention will appear more fully hereinafter, it being understood that the specific embodiment of the invention described herein is illustrative only and that modifications thereof falling within the scope of the appended claims will be apparent to persons skilled in the art.

In the drawings:

Figure 3 is a longitudinal section through a multiple corrugation expansion joint embodying the present invention.

Figure 1:
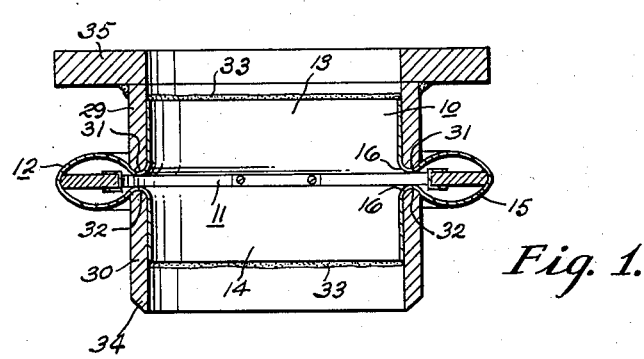
Figure 1 is a longitudinal section through an expansion joint embodying the present invention.

Referring to the drawing and particularly to Figure 1, it will be observed that the expansion joint of the present invention essentially comprises a bellows element 10 internally fitted with a supporting ring 11 and externally fitted with means for securement of the joint in a pipe line.

The bellows element 10 is formed from a round tubular section and is provided with an annularly corrugated portion 12 intermediate axially alined tubular opposite end portions 13 and 14. The corrugation 12 has an outer ovaloid part 15 entirely concave to the interior of the bellows element and disposed with its major axis normal to the longitudinal axis of the bellows element, the part 15 being joined to the axially alined tubular portions 13 and 14 by inner curved parts 16—16 which are entirely convex to the interior of the bellows element.

Figure 2:
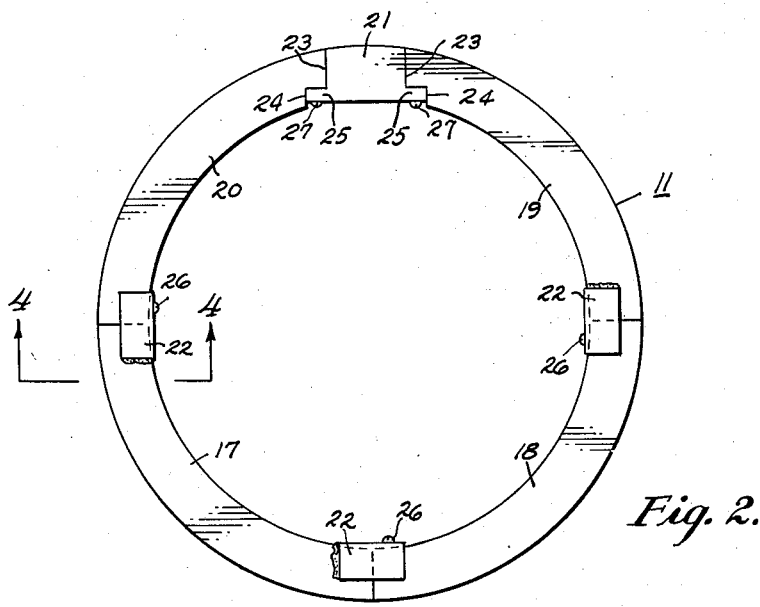
Figure 2 is a plan view of the supporting ring shown in Figure 1, the ring being shown in assembled condition but apart from the other elements of the expansion joint.
Figure 4:
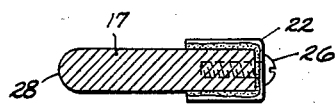
Figure 4 is an enlarged section on line 4—4 of Figure 2.

Referring now particularly to Figures 2 and 4 it will be observed that the supporting ring 11 is a flat annular member essentially comprising four principal segments 17 to 20, inclusive, and a key segment 21 arranged in coplanar relation for detachable securement together. The segment 17 forms one-quarter of the supporting ring, and the opposite end portions thereof are fitted with connecting elements in the form of plates 22—22. Each of the latter is bent to U-shape and disposed in embracing relation to the associated end portion of segment 17, being fixedly secured thereto as by welding and being positioned thereby with the closed side thereof on the inside of the segment 17 and one end thereof in longitudinal continuation of the segment 17.

The segment 18 forms another one-quarter of the supporting ring and is disposed in end abutting relation to the segment 17, the abutting end of segment 18 being embraced by the portion of the associated U-shaped plate 22 overhanging segment 17.

The segment 19 forms less than one-quarter of the supporting ring and is disposed in end abutting relation to the segment 18, the abutting end of segment 19 being provided with a connecting element 22 secured thereto as in the case of segment 17 and disposed thereby in embracing relation to the proximate end of the segment 18.

The segment 20 also forms less than one-quarter of the supporting ring and is disposed in end abutting relation to the segment 17, the abutting end of segment 20 being embraced by the portion of the associated U-shaped plate 22 overhanging segment 17.

For closing the supporting ring 11, the key segment 21 is disposed between the proximate end portions of segments 19 and 20, the latter members being provided with parallel edges 23—23 and being undercut on the inside thereof as at 24—24 for snugly receiving wing portions 25—25 which are integrally formed with key segment 21 and which extend in longitudinal continuation thereof.

For detachably securing together the segments 17 to 21, inclusive, the portion of each U-shaped plate 22 overhanging the segment to which it is fixedly secured is apertured to receive a threaded screw 26 projected therethrough and into an alined tapped opening in the segment end portion detachably embraced thereby. In addition, wing portions 25—25 are apertured to receive threaded screws 27—27 projected therethrough and into alined tapped openings in the proximate end portions of segments 19 and 20.

The supporting ring 11, in the assembled condition just described, is disposed interiorly of the corrugation 12 of the bellows element 10, the outer circumferential edge of the supporting ring 11 being rounded as at 28 and being disposed in abutting relation to the inside surface of the outermost portion of the corrugation 12. It will be observed that the inner circumferential edge of the supporting ring 11 is spaced from the proximate portions of the corrugation 12.

For securing the bellows element 10 in a pipe line its tubular portions 13 and 14 are respectively provided with oppositely extending nipple members 29 and 30. These members are respectively provided with rounded circumferential edges 31 and 32 which more or less snugly nest in the curved convex parts 16—16, the members being secured to the tubular portions 13 and 14 by any conventional form of welding or brazing, as by edge welding shown at 33. The outer free ends of the nipple members 29 and 30 are adapted to be secured directly into a pipe line, e. g., by beveling an end, as at 34 for welding it into a pipe line, or by suitably securing thereto a bolting flange as at 35. It will be understood of course, that both of the opposite ends of the joint may be provided with welding ends such as designated 34 or with bolting flanges such as designated 35.

Although the supporting ring 11 is shown and described as comprising four principal segments and a key segment, it will be understood that the number of elements shown is illustrative only. The number of supporting ring segments used in any particular case depends principally on the inside dimensions of the initial corrugation with which the bellows element 10 is provided, the inside diameter of the opposite end portions 13 and 14, and the thickness of the material from which the supporting ring is fabricated. In some cases it may be necessary to use more than four principal segments in addition to the key segment. In other cases it may be possible to dispense with the key segment altogether and to use identical principal segments only.

Still other forms of the supporting ring 11 are within the purview of the present invention. For example, it is not essential that the outer circumferential edge of the supporting ring be continuous; a form of ring presenting a broken outer edge for supporting portions of the annular corrugation suitably spaced thereabout may be used. Furthermore, the ring may readily be designed with an inside diameter which is less than that of the opposite ends 13 and 14 of the bellows element.

The expansion joint of the present invention is particularly suited for use where space limitations make it necessary to impose large movements on an expansion joint operating at high temperatures. It will be understood that at high operating temperatures the yield strength of the metal is lowered, and, consequently, the cross section of the corrugation with which the expansion joint is provided tends to lose its ovaloid form due to yielding of the metal under pressure and tends, instead, to assume a circular form. In order to prevent such change in form of the corrugation during use of the joint, the ring 11 is provided for internally engaging the outermost circumferentially extending portion of the corrugation to prevent bulging of the corrugation width and to prevent a corresponding reduction of the corrugation depth. It will be apparent that due to the tendency under pressure for reduction of the corrugation depth there is a corresponding tendency for a reduction of the diameter of the aforementioned outermost circumferentially extending portion of the corrugation, and, consequently, a compressive force is exerted upon the outer circumferential edge of the supporting ring 11, which latter must be designed to withstand the same. It is to be understood that expansion joints having a plurality of annular corrugations is within the purview of the present invention, and for such expansion joints a supporting ring 11 is provided for each corrugation. An expansion joint having two annular corrugations is illustrated in Figure 3 of the drawings. The elements of Figure 3 which correspond to similar elements in Figure 1 are denoted by the same reference numeral excepting that the reference numerals of Figure 3 are primed. Additionally, Figure 3 includes an intermediate supporting section 36 disposed about the bellows element 10 between the corrugations 12'—12' and having rounded circumferential edges 37 similar to the rounded edges 31' and 32' of the nipple members 29' and 30'.

It will be understood that the present invention is susceptible to various changes, modifications and applications which may be made from time to time without departing from the principles thereof and that it is intended to claim the invention broadly, as well as specifically, as indicated in the appended claims.

What is claimed as new and useful is:

1. In an expansion joint adapted for operatively interconnecting axially spaced opposed end portions of a pair of pipe line sections, a bellows element comprising a plurality of axially aligned tubular portions and an annularly corrugated portion between each successive pair of said tubular portions, each of said corrugations including an outer ovaloid part entirely concave to the interior of the pipe and jointed to the adjacent tubular portions by inner curved parts entirely convex to the interior of the pipe, the major axis of said ovaloid part being normal to the axis of said bellows element, annular external means respectively embracing said tubular portions to reinforce the same and afford support for said curved convex inner parts against flexing under operating conditions, and annular internal means within each of said annular corrugations, each of the latter means being structurally and functionally independent of the others and self-locked in place and having an outer peripheral edge abutting the outermost circumferentially extending portion of the corrugation to thereby support the same against any reduction in diameter, each of said annular internal means comprising a ring member that is flat as a whole and which includes a plurality of coplanar segments of a like thickness substantially corresponding to the clear distance between the curved convex inner parts of the corrugations, certain of said segments being arcuately shaped about an axis normal to the plane of the segment and being positioned in end to end relation to thereby conjointly form the major part of said ring member, and one of said segments being a key segment operative to close said ring, said external and internal annular means being conjointly operative to stay any outward bulging of the side walls of said ovaloid part under operating conditions, and said annular internal means being disposed wholly within said corrugation to thereby provide an unobstructed passage through said bellows element.

2. In an expansion joint as defined in claim 1 wherein said coplanar segments are of a width to extend from the outermost circumferentially extending portion of the corrugation radially inwardly to, but falling short of, the curved convex inner parts of the corrugation, whereby said ring is spaced radially outward from and concentric to said convex inner parts of the corrugation.

3. In an expansion joint adapted for operatively interconnecting axially spaced opposed end portions of a pair of pipe line sections, a bellows element comprising a pair of axially aligned tubular portions and an annularly corrugated portion between said pair of tubular portions, said corrugation including an outer ovaloid part entirely concave to the interior of the pipe and jointed to the adjacent tubular portions by inner curved parts entirely convex to the interior of the pipe, the major axis of said ovaloid part being normal to the axis of said bellows element, annular external means respectively embracing said tubular portions to reinforce the same and afford support for said curved inner parts against flexing under operating conditions, and annular internal means self-locked in position within said annular corrugation and said internal means having an outer peripheral edge abutting the outermost circumferentially extending portion of the corrugation to thereby support the same against any reduction in diameter, said annular internal means comprising a ring member that is flat as a whole and which includes a plurality of coplanar segments of a like thickness substantially corresponding to the clear distance between the curved convex inner parts of the corrugations, certain of said segments being arcuately shaped about an axis normal to the plane of the segment and being positioned in end to end relation to thereby conjointly form the major part of said ring member, and one of said segments being a key segment operative to close said ring, whereby said internal annular means is self-sustained in complete ring form independently of other parts of the expansion joint, said external and internal annular means being conjointly operative to stay any outward bulging of the side walls of said ovaloid part under operating conditions, and said annular internal means being disposed wholly within said corrugation to thereby provide an unobstructed passage through said bellows element.

4. In an expansion joint as defined in claim 3 wherein said coplanar segments are of a width to extend from the outermost circumferentially extending portion of the corrugation radially inwardly to, but falling short of, the the curved convex inner parts of the corrugation, whereby said ring is spaced radially outward from and concentric to said convex inner parts of the corrugation.

(References on following page)

References Cited in the file of this patent

UNITED STATES PATENTS

| | | |
|---|---|---|
| 381,825 | Brinckerhoff | Apr. 24, 1888 |
| 582,804 | Billings et al. | May 18, 1897 |
| 1,052,709 | Badger | Feb. 11, 1913 |
| 1,345,971 | Star | July 6, 1920 |
| 2,243,522 | Conklin | May 27, 1941 |
| 2,318,006 | Mercier | May 4, 1943 |
| 2,411,874 | Golden | Dec. 3, 1946 |
| 2,699,959 | Zallea | Jan. 18, 1955 |
| 2,770,259 | Zallea | Nov. 13, 1956 |

FOREIGN PATENTS

| | | |
|---|---|---|
| 315,487 | Germany | July 25, 1931 |
| 248,073 | Switzerland | Apr. 15, 1947 |